Patented Oct. 17, 1944

2,360,388

UNITED STATES PATENT OFFICE 2,360,388

ALUMINUM SUBACETATE-PRODUCING COMPOSITION

Herman Berger, Bronx, N. Y.

No Drawing. Application June 2, 1942,
Serial No. 445,453

8 Claims. (Cl. 167—72)

My present invention relates to a new composition of matter for use as a pharmaceutical product and to new processes for producing the same.

An object of my present invention consists in preparing an aluminum subacetate solution free of a calcium sulphate precipitate.

A further object of my present invention consists of a solution for wet dressings which is free of calcium sulphate in crystalline state.

Still a further object of my invention consists of processes for preparing such an aluminum subacetate solution.

With the above objects in view, my invention mainly consists of a new composition of matter for use as a pharmaceutical product which comprises calcium acetate, aluminum sulphate and a substance adapted to react with calcium sulphate and to form with the same, during this reaction, a compound which is more easily soluble in water than calcium sulphate. The addition of this substance serves the purpose of preventing crystallization of the calcium sulphate formed when my pharmaceutical product is dissolved in water and the calcium acetate and aluminum sulphate contained in the same react with each other and are forming besides aluminum subacetate also calcium sulphate.

I have found that various substances are adapted to form with calcium sulphate such compounds, i. e., compounds which are more easily soluble in water than calcium sulphate and thereby to prevent crystallization of this calcium sulphate; such substances are for instance all compounds which are adapted to free ammonia or various ammonia derivatives when dissolved in water, e. g., benzamide, urea, and other similarly reacting substances.

Compounds the addition of which proved specially advantageous for preventing crystallization of the calcium sulphate are, as I have found, acid amides or their derivatives, e. g., acetanilid and acetphenitidin. Addition of a small percentage of these compounds which are entirely harmless from the pharmaceutical point of view, are adapted to prevent crystallization of the calcium sulphate or at least to substantially delay such a crystallization process.

The final aluminum subacetate solution may be prepared in the most different ways. Thus, for instance, it is possible to make two separate initial solutions, namely a calcium acetate solution and an aluminum sulphate solution separately and to mix these initial solutions. In this case, the substance which has to prevent crystallization of the calcium sulphate formed during mixing of these initial solutions has to be present in one or both of these solutions. It is also possible and it is practically the way in which my present invention is usually carried out, to make two tablets, one of them consisting of aluminum sulphate and the other of calcium acetate and to form the aluminum subacetate solution by dissolving these tablets in water; in this case, the acid amide, e. g., acetanilid or acetphenitidin or another compound having the same effects, is incorporated in one or both of these tablets or added to the water before the tablets are dissolved in the same. At any rate, it is of importance that the reaction between the calcium acetate and aluminum sulphate should take place in the presence of the acid amide and that this substance should not be added to the solution of aluminum subacetate after its formation.

Preparations which proved to be very satisfactory therapeutically contain from 0.5% to 3% of an acid amide, e. g. acetanilid or acetphenitidin. This acid amide is added to one of the tablets, preferably to the tablet containing calcium acetate, while to the other tablet, i. e., to the tablet containing aluminum sulphate, I add a small amount of pectin. This latter addition has the effect of accelerating dissolution of the tablets when they are dropped into water.

Tablets of the type claimed by me can for instance be produced in the following way:

Calcium acetate on the one hand and aluminum sulphate on the other are intimately mixed with binding agents and out of these mixtures separate tablets are produced by compressing. Before this compression, a small percentage, e. g., about 1%, of an acid amide, for instance acetanilid or acetphenitidin, is added to one or both of these mixtures. In a practical embodiment of my invention, one of these tablets contains 1.5 grams of calcium acetate and the other 2.3 grams of aluminum sulphate and both tablets contain together about .038 gram of acetanilid or acetphenitidin. This means that both tablets together contain about 39% of calcium acetate, about 60% of aluminum sulphate, and about 1% of acetanilid or acetphenitidin. The aluminum subacetate solution is produced by dissolving these two tablets in a certain amount of water which for wet dressings should be about one pint for two tablets. The above described reaction of the calcium acetate with the aluminum sulphate results in formation of an aluminum subacetate solution while the calcium sulphate formed during this reaction reacts with the acid amide and remains also in solution instead of forming a precipitate.

This aluminum subacetate solution may also be formed by mixing of two initial solutions instead of forming the final solution by dissolving the above described tablets. In this case, the initial solutions of calcium acetate and aluminum sulphate have to be prepared separately and one or both of them have to contain the acetanilid or acetphenitidin added for preventing crystallization of the calcium sulphate formed during reaction of the above ingredients.

It will be understood that each of the elements described above, or two or more together, may also find a useful application in combination with other therapeutical products differing from those described above.

While I have illustrated and described the invention as embodied in aluminum subacetate solutions for therapeutical purposes, I do not intend to be limited to the details shown, since various modifications and changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. A pharmaceutical composition comprising, a mixture of calcium acetate, aluminum sulphate and a small percentage of benzamide.

2. A pharmaceutical composition comprising, a mixture of calcium acetate, aluminum sulphate and a small percentage of at least one water soluble acid amide adapted to at least substantially prevent crystallization of the calcium sulphate formed when said mixture is dissolved in water.

3. A pharmaceutical composition comprising, a mixture of calcium acetate, aluminum sulphate and a small percentage of acetanilid.

4. A pharmaceutical composition comprising a mixture of calcium acetate, aluminum sulphate and from 0.5% to 3% of a compound selected from the group of the water soluble acid amides adapted to at least substantially prevent crystallization of the calcium sulphate formed when said mixture is dissolved in water.

5. A pharmaceutical composition comprising, a mixture of about 35% to 45% of calcium acetate, about 55% to 65% of aluminum sulphate, and about 0.5% to 3% of acetanilid.

6. A pharmaceutical composition comprising, a mixture of about 39% of calcium acetate, about 60% of aluminum sulphate, and about 1% of a compound selected from the group of the water soluble acid amides adapted to at least substantially prevent crystallization of the calcium sulphate formed when said mixture is dissolved in water.

7. A pharmaceutical composition comprising, a mixture of calcium acetate, aluminum sulphate and a small percentage of acetphenitidin.

8. A pharmaceutical composition comprising, a mixture of about 35% to 45% of calcium acetate, about 55% to 65% of aluminum sulphate, and about 0.5% to 3% of acetphenitidin.

HERMAN BERGER.